US011863388B1

(12) United States Patent
Pignataro et al.

(10) Patent No.: US 11,863,388 B1
(45) Date of Patent: Jan. 2, 2024

(54) ENERGY-AWARE TRAFFIC FORWARDING AND LOOP AVOIDANCE

(71) Applicant: Cisco Technology, Inc., San Jose, CA (US)

(72) Inventors: Carlos Pignataro, Cary, NC (US); Eric A. Voit, Bethesda, MD (US); Nagendra Kumar Nainar, Morrisville, NC (US); Marcelo Yannuzzi, Nuvilly (CH)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 18/193,935

(22) Filed: Mar. 31, 2023

(51) Int. Cl.
*H04L 41/0833* (2022.01)
*H04L 45/48* (2022.01)
*H04L 41/12* (2022.01)

(52) U.S. Cl.
CPC .......... *H04L 41/0833* (2013.01); *H04L 41/12* (2013.01); *H04L 45/48* (2013.01)

(58) Field of Classification Search
None
See application file for complete search history.

(56) References Cited

U.S. PATENT DOCUMENTS

| 9,250,684 | B1 * | 2/2016 | Chen | G06F 1/3206 |
| 9,253,719 | B2 * | 2/2016 | Ansari | H04W 48/20 |
| 9,819,583 | B2 * | 11/2017 | Dharmadhikari | H04L 43/08 |
| 2015/0081374 | A1 * | 3/2015 | Sahlstrom | G06Q 10/06315 705/30 |
| 2019/0109891 | A1 * | 4/2019 | Paruchuri | H04L 9/40 |
| 2021/0111994 | A1 * | 4/2021 | Li | H04L 45/38 |

FOREIGN PATENT DOCUMENTS

CN 107579922 A 1/2018

OTHER PUBLICATIONS

Kim, H., et al. "Sustainable Load-Balancing Scheme for Inter-Sensor Convergence Processing of Routing Cooperation Topology," Sustainability. May 3, 2016; https://doi.org/10.3390/su8050436.

* cited by examiner

*Primary Examiner* — Backhean Tiv
(74) *Attorney, Agent, or Firm* — Rutan & Tucker, LLP

(57) ABSTRACT

Energy-aware configurations can be utilized to operate a network based on sustainability-related metrics. In many embodiments, a suitable device includes a processor, a memory commutatively coupled to the processor, a plurality of elements, a communication port, and an energy-aware topology logic configured to collect topology data from one or more network devices, wherein each of the one or more network devices include a plurality of elements. The energy-aware topology logic can receive power source data and power usage data related to plurality of elements and generate an element energy coefficient (EEC) for a plurality of elements. Subsequently, the energy-aware topology logic can also generate an energy-aware configuration for at least one of the one or more network devices, and then pass the generated energy-aware configuration to the at least one network device, wherein the energy-aware configuration is configured to steer traffic based on at least one sustainability-related metric.

20 Claims, 9 Drawing Sheets

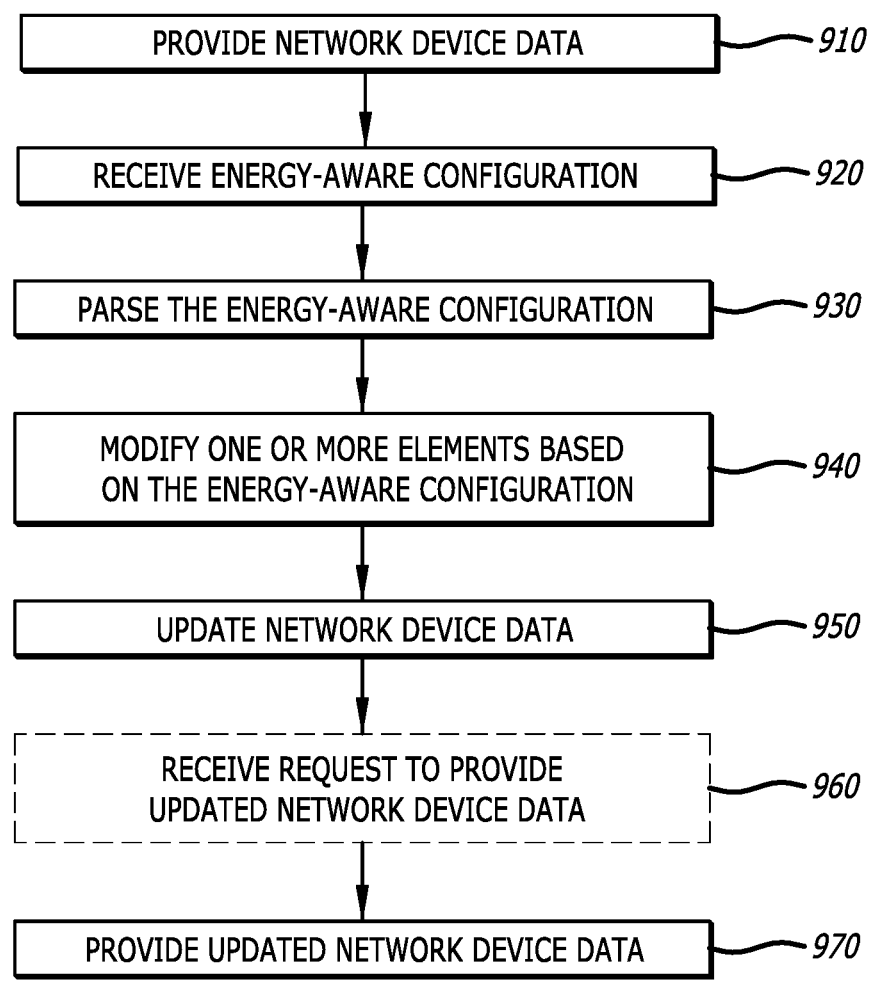

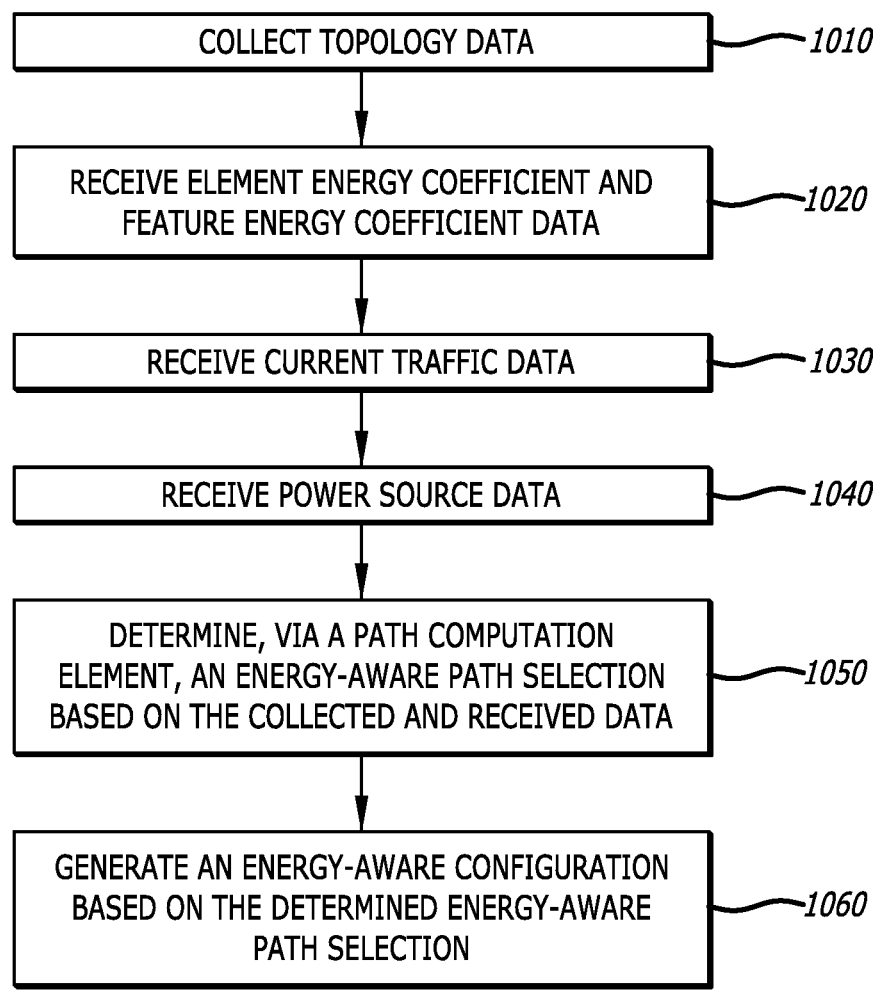

ENERGY-AWARE TRAFFIC FORWARDING AND LOOP AVOIDANCE

The present disclosure relates to network management. More particularly, the present disclosure relates to utilizing sustainability-related data and network device capabilities to generate an energy-aware configuration for a network.

BACKGROUND

Network systems are designed to steer traffic along various paths. These paths can be configured to balance load traffic, avoid loops, and aggregate various links within the network. A network can have multiple servers, routers, and other networking devices passing data traffic through them. Load balancing is a process of distributing network traffic across these devices evenly to avoid one device getting overwhelmed. Load balancing can also increase network efficiency and optimize application traffic delivery.

Network loops can occur when a network has more than one active path between the various devices carrying traffic from the same source to the same destination. Specifically, certain data being transferred within the network can be configured in such a way that the data is repeatedly broadcast to flood the network until a network failure occurs. Traditional solutions to loop avoidance include creating a loop-free topology using link aggregation, shortest path bridging, spanning tree protocols, along with other methods.

Link aggregation generally refers to the combining of multiple network connections in parallel by various methods. This can increase the total throughput beyond what single connection could sustain while also providing redundancy where all but one of the physical links may fail without losing connectivity. A link aggregation group (LAG) may refer to the combined collection of physical ports in this process.

Traffic forwarding can involve a number of methods such as, but not limited to, equal-cost multi-path routing (ECMP). ECMP is a routing strategy where packet forwarding to a single destination can occur over multiple best paths with equal routing priority. Often, this is done with a per-hop local decision being made independently at each router or network device. Current ECMP techniques are often based on the number of links and the traffic load on each link. However, these systems don't consider sustainability-related objectives when making network management decisions, which is counter to the increasing number of clients and network administrators are concerned about the carbon footprint operating the network can cause.

SUMMARY

Systems and methods for generating an energy-aware configuration within a network in accordance with embodiments of the disclosure are disclosed. In many embodiments, a suitable device includes a processor, a memory commutatively coupled to the processor, a plurality of elements, a communication port coupled with one or more neighboring devices, and an energy-aware topology logic configured to collect topology data from one or more network devices, wherein each of the one or more network devices include a plurality of elements. The energy-aware topology logic can receive sustainability-related capabilities of one or more network devices and generate an element energy coefficient (EEC) for a plurality of elements. Subsequently, the energy-aware topology logic can also generate an energy-aware configuration for at least one of the one or more network devices, and then pass the generated energy-aware configuration to the at least one network device, wherein the energy-aware configuration is configured to steer traffic based on at least one sustainability-related metric.

In a number of embodiments, the topology data is collected from L2 and L3 topologies.

In more embodiments, the energy-aware configuration is configured to avoid looping within the L2 and L3 topologies.

In certain embodiments, the energy-aware configuration is configured to enable link aggregation.

In various embodiments, the energy-aware configuration is configured to enable trunking.

In additional embodiments, the energy-aware topology data is also configured to receive power source data and power usage data.

In more additional embodiments, the EEC is generated at least in part on the received power source data and power usage data.

In still more embodiments, the EEC is generated for a single network device.

In further embodiments, the EEC is generated for a plurality of network devices.

In yet more embodiments, the plurality of network devices includes a link aggregation group.

In further additional embodiments, the energy-aware topology is also configured to receive link aggregation data.

In yet more embodiments, the link aggregation data is received via a link aggregation control protocol.

In more various embodiments, the energy-aware topology is also configured to receive loop avoidance data.

In yet further additional embodiments, the loop avoidance data is received via a spanning tree protocol.

In a number of more embodiments, the energy-aware topology is also configured to receive load balancing data.

In still yet more embodiments, the energy-aware topology is also configured to receive service level objective data.

In additional embodiments again, the service level objective data is defined by a network administrator.

In still yet further embodiments, the energy-aware configuration is passed to an orchestrator logic that is configured to push the energy-aware configuration across one or more layers of the network to the at least one network device.

In various additional embodiments, the energy-aware configuration is also configured to modify the operation of one or more elements within a plurality of network devices.

In many further embodiments, the modification of the one or more elements within the plurality of network devices generates a new link aggregation group.

In yet more additional embodiments, the modification of the one or more elements within the plurality of network devices disables at least one port within a network device of the plurality of network devices.

In still certain embodiments, the modification of the one or more elements within the plurality of network devices is configured to provide traffic forwarding without loops based on one sustainability-related metric.

In more further embodiments, the modification of the one or more elements within the plurality of network devices is configured to provide weighted load balancing based on one sustainability-related metric.

In a number of various embodiments, a device for generating an energy-aware configuration includes a processor, a memory commutatively coupled to the processor, a plurality of elements, a communication port coupled with one or more neighboring devices, and an energy-aware topology logic configured to collect topology data from one or more network devices, wherein each of the one or more network devices include a plurality of elements. The energy-aware topology logic can receive sustainability-related capabilities of one or more network devices and generate a feature energy coefficient (FEC) for a plurality of elements. Upon reception, the energy-aware configuration logic can generate an energy-aware configuration for at least one of the one or more network devices. The energy-aware configuration is configured to modify at least one sustainability-related capability within the at least one network device and pass the generated energy-aware configuration to the at least one network device, wherein the network device modifies the at least one sustainability-related capability.

In additional embodiments again, the energy-aware topology data is also configured to receive energy consumption data.

In still more additional embodiments, the energy consumption data includes data associated with a plurality of capability combinations.

In yet further various embodiments, the FEC is generated for a single network device.

In still further additional embodiments, the FEC is generated for a plurality of network devices.

In some embodiments, the plurality of network devices includes a link aggregation group.

In various additional embodiments, the sustainability-related capability modification is associated with the operation of one or more elements within a plurality of network devices.

In still more further embodiments, the modification of the one or more elements within the plurality of network devices generates a new link aggregation group.

In a multiple of embodiments, a network device element includes an energy-aware topology logic configured to collect topology data from one or more network devices. Each of the one or more network devices include a plurality of elements. The energy-aware topology logic can subsequently receive element energy coefficient data and feature energy coefficient data associated with the one or more network devices, as well as current traffic data, power source data, and sustainability-related capabilities of one or more network devices. In return, the energy-aware topology logic can generate an energy-aware configuration for at least one of the one or more network devices, wherein the energy-aware configuration includes an energy-aware path selection.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The description of the present disclosure will be more fully understood with reference to the following figures, which are presented as exemplary embodiments of the disclosure and should not be construed as a complete recitation of the scope of the disclosure, wherein:

FIG. 9 is a flowchart depicting a process for operating a network device within an energy-aware network in accordance with an embodiment of the disclosure; and FIG. 10 is a flowchart depicting a process for utilizing a path computation element to generate an energy-aware configuration in accordance with an embodiment of the disclosure.

Figure 1:
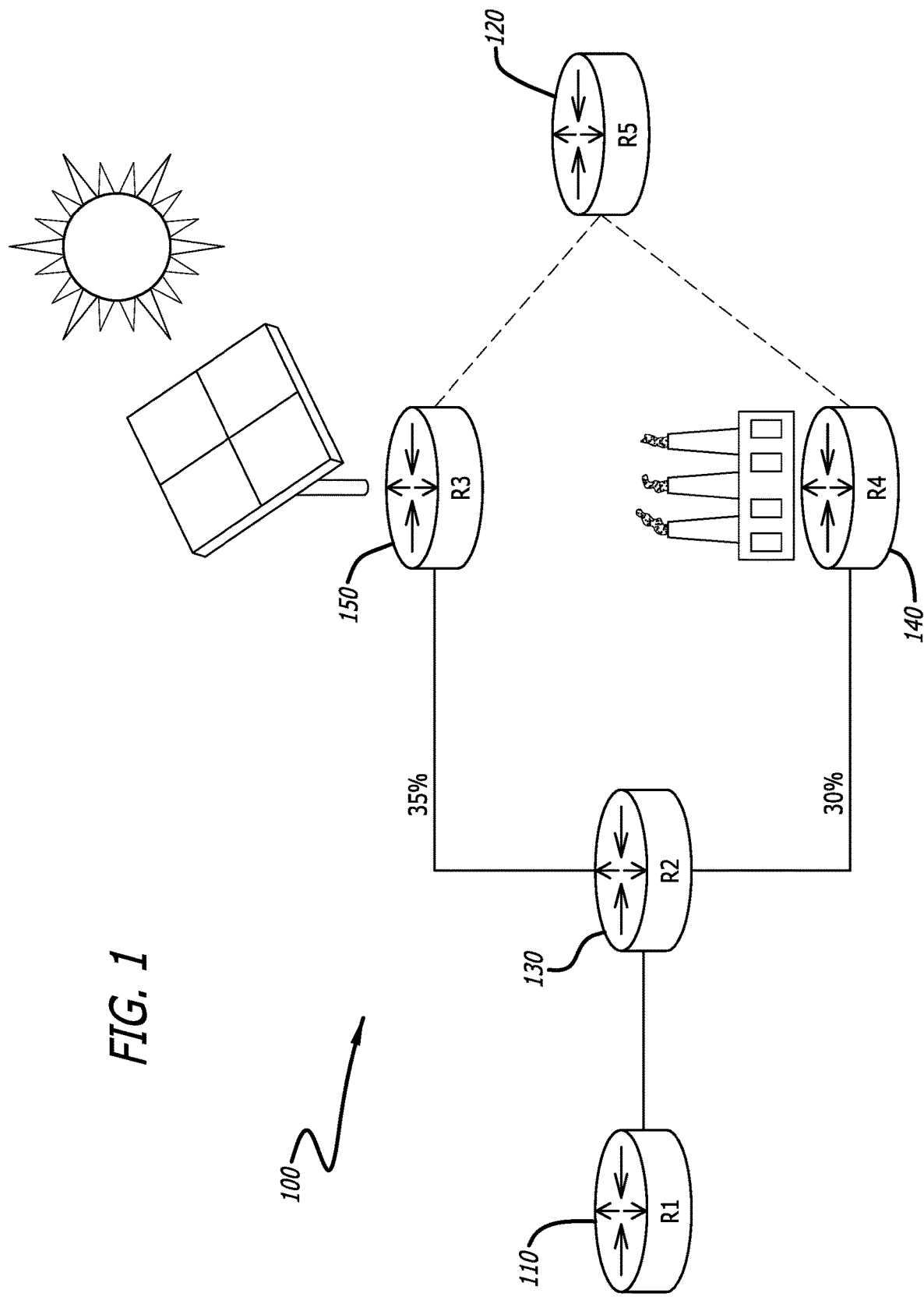
FIG. 1 is a conceptual diagram of a network suitable for energy-aware traffic forwarding and loop avoidance in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that allow for managing networks with an energy-aware configuration. By generating and implementing energy-aware configurations, various embodiments can choose paths for traffic and modify the configuration of devices within the network that have a better environmental impact. This is in contrast to traditional methods that attempt to steer traffic and configurations over the best performing paths and devices in order to reduce metrics such as jitter, delay, latency, drop, etc. However, other metrics such as power source type, or energy efficiency can also be considered in various embodiments to generate network configurations that can be more environmentally sustainable.

As described in more detail below, the energy-aware configurations can be generated based on an element energy coefficient, or a feature energy coefficient. These two coefficients can be generated to better provide data sufficient to generate a more energy-aware configuration. In many embodiments, an element energy coefficient can be generated for each element within a network device, a portion of elements, or a grouping of elements as needed. Each element can provide their current state and energy usage data to a device that can generate an element energy coefficient. In similar embodiments, each device and/or element in a network device can be configured with various attributes or capabilities that may be sustainability-related. These capabilities can include operating at a lower power level or shutting down one or more elements or components when not needed or in use. A feature energy coefficient can be generated for each element, device, or portion/combination thereof that evaluates each combination of capabilities and their resultant energy usage.

Once an EEC or FEC is generated, one or both can be utilized to generate an energy-aware configuration for the network. Other data may be considered such as link aggregation data, and other loop avoidance data, such as through spanning tree protocols, etc. Additional load balancing and configuration data can also be suitable as input for generating an energy-aware configuration. The generation of the energy-aware configuration can occur on a single device, such as the device that also generates the EEC and/or FEC but may be generated by a separate and/or specialized device in communication with the network. Additionally, as those skilled in the art will recognize, these energy-aware configurations can be generated for various levels of topology such as L2 and L3 topologies. As a result, topology data and other data relating to the network and the generation of the energy-aware configuration can span multiple levels of topologies.

Upon generation, the energy-aware configuration can be broadcast or otherwise sent to the network to implement the determined modifications. For example, data traffic paths that may have previously only been selected the overall costs of transporting bits or the available bandwidth may instead be moved to a different router or network switch that is being powered by a sustainable power source. Additionally, it may be determined that various paths within the network are not necessary based on the current traffic load and/or set of inputs. Therefore, one or more elements, such as a line card, port, etc. may enter a sleep mode, or shut down for a predetermined interval of time and/or in response to an event.

Additionally, other elements may be utilized to generate or support the generation of an energy-aware configuration. By way of non-limiting example, a path computing element can be provided a plurality of inputs, including sustainability-related metrics, that can result in an output that can either be an energy-aware configuration, or be input into a process that generates an energy-aware configuration. In this way, one or more machine learning methods can be utilized in the generation of an energy-aware configuration.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual diagram of a network suitable for energy-aware traffic forwarding and loop avoidance in accordance with an embodiment of the disclosure is shown. The network 100 can include a plurality of devices, e.g., routers 110, 130, 140 and 150, which can be in communication with each other and/or a remote server, such as a cloud-based server 120. The network 100 depicted in FIG. 1 is shown as a simplified, conceptual network. Those skilled in the art will understand that a network 100 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," "power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Traditionally, devices operating within a network 100 have not considered various aspects of operation that can relate to the overall sustainability of the network. For example, devices in communication networks have often used grid-supplied energy as a primary power source. This grid-supplied energy can regularly provide energy that has been generated by a negative environmental impacts-heavy power source such as a coal-powered power plant. However, modern power grids often have more diverse and cleaner energy sources for the provided generated energy. Some devices can still be powered by power sources that utilize fossil fuels, such as the router R4 140 as depicted in FIG. 1. Alternatively, some devices can operate by using renewable sources of energy, such as the router R3 150 which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability-related attributes.

In the embodiment depicted in FIG. 1, the operation of a coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_2e$ kg/kWh metric which measure the amount of kilowatt hours produced per kilogram of carbon dioxide gases released into the environment. Therefore, when discussing a negative environmental impacts-heavy power source compared to a clean(er) power source, the clean power source can, for example, have a better $CO_2e$ kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to an event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability-related attributes of that network device. During operation, one or more devices within the network may seek and collect the sustainability-related attributes of various network devices, which can provide insight into both the type of power source providing power to the device, but also the various capabilities of the network device that may be activated to provide more efficient operation.

Additionally, when generating various scores, metrics, or other evaluations of the network devices within a network 100, the sustainability-related attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 1 may also be interchangeable with other elements of FIGS. 2-8 as required to realize a particularly desired embodiment. Augmented protocols to carry out these described processes are described below.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 1 may also be interchangeable with other elements of FIGS. 2-10 as required to realize a particularly desired embodiment. Augmented protocols to carry out these described processes are described below.

Figure 2:
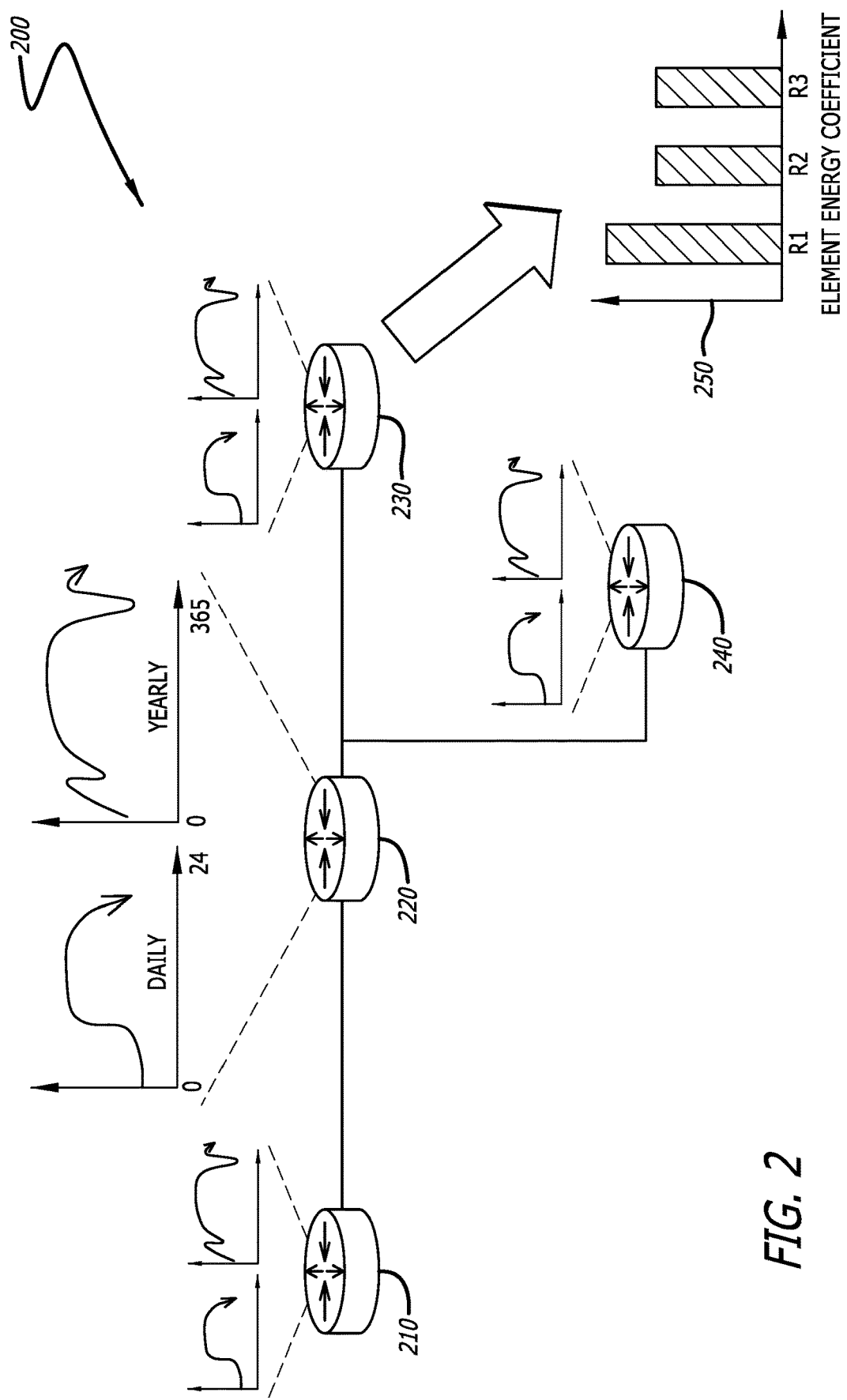
FIG. 2 is a conceptual diagram of an element energy coefficient in accordance with an embodiment of the disclosure.

Referring to FIG. 2, a conceptual diagram of an element energy coefficient (EEC) 250 in accordance with an embodiment of the disclosure is shown. In many embodiments, the element energy coefficient 250 can be a multi-layer network element that may collect and analyze L2 and L3 topologies along with sustainability-related attributes. By collecting this data, the EEC 250 can be configured to be utilized for the generation of an energy-aware configuration. The collected data can be combined and consolidated in order to focus on a selection of various energy-efficient, or energy-aware priorities.

Generally, an EEC 250 can be generated based on the energy source and/or power consumption of each device within the network. The embodiment depicted in FIG. 2 shows that the generated EEC 250 has been computed for the path through three routers R1 210, R2 220, and R3 230. Subsequently, an additional EEC can be generated for the path from R1 210 to R4 240. In various embodiments, these generated EECs can be compared against each other when generating an energy-aware configuration.

Each device within the EEC 250 can be generated based on a variety of factors. For example, the embodiment depicted in FIG. 2 shows that energy usage data is available on both a daily and yearly scale. As those skilled in the art will recognize, the EEC 250 can be generated based on a number of factors depending on the availability of the data and the application desired. It is contemplated that other data inputs, and scales of time can be utilized. For example, the EEC can also consider data related to the type of power source, such as the different power sources depicted in FIG. 1.

In additional embodiments, the EEC 250 can be generated for each individual network device, or elements within that those devices such as, but not limited to line cards, ports, links, potential link aggregation groups, etc. As discussed in more detail below, various embodiments can utilize this data within a separate logic, sometimes in coordination with other input data, to generate an energy-aware configuration for one or more devices within the network. In some embodiments, the EEC 250 can be generated continuously and passed to a receiving logic. However, in further embodiments, the EEC 250 can be generated after a predetermined period of time, or in response to an event such as, but not limited to, a request from an external device.

Figure 3:
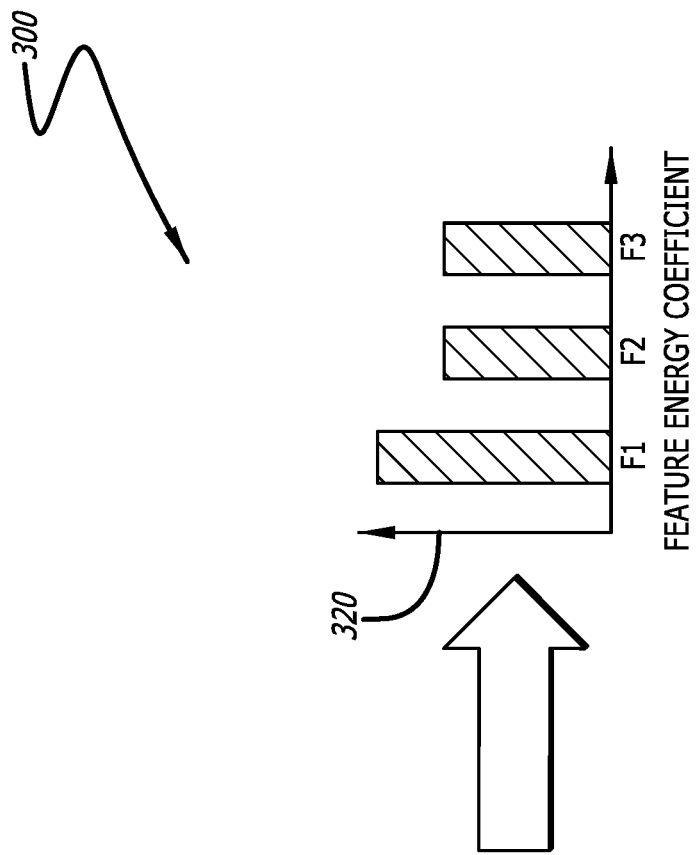
FIG. 3 is a conceptual diagram of a feature energy coefficient in accordance with an embodiment of the disclosure.
Figure 3:
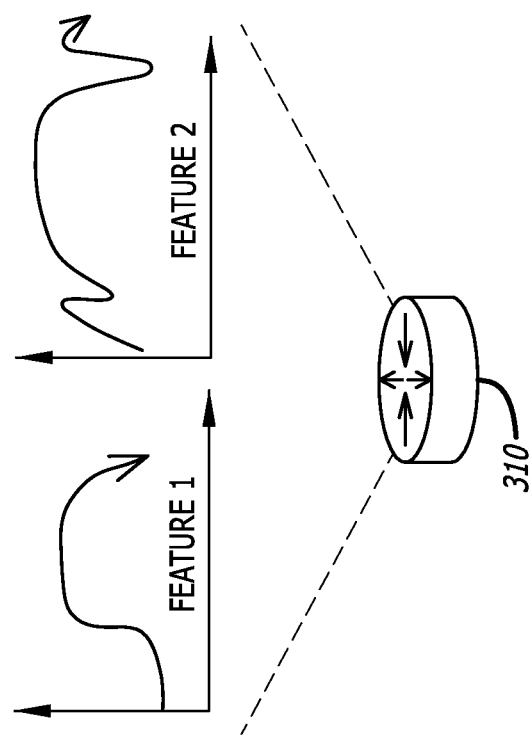

Referring to FIG. 3, a conceptual diagram of a feature energy coefficient 320 in accordance with an embodiment of the disclosure is shown. In a number of embodiments, the feature energy coefficient (FEC) 320 can be generated based on the energy consumption for different feature combinations. Many network devices can be equipped with a variety of different features or capabilities that can be turned on or off. Often, these network devices can be equipped with a plurality of different sustainability-related capabilities. By way of non-limiting example, a router may be equipped with the capability to turn a particular line card or port on or off. Alternatively, they may also enter a lower power or "sleep" mode. Other sustainability-related capabilities may be present and can be turned on or off in a variety of combinations. Thus, an FEC 320 can be generated for each possible combination. However, in certain embodiments, the FEC 320 may be limited to being generated for a limited set of feature combinations, such as those that are most likely to yield positive results, or by those that are typically used by neighboring network devices.

In the embodiment depicted in FIG. 3, a router 310 has a plurality of features that can be turned off and on. Specifically, there are two features, feature 1 and feature 2, which have an energy consumption chart calculated which can be representative of an estimated power consumption over a given time. In additional embodiments, the features can be a sustainability-related capability that when activated, provides one or more increased operational efficiency, and/or reduced power or shut down mode, among others. The FEC 320 can be configured to calculate the energy results of engaging a variety of combinations of the available features or capabilities of the given device, such as the router 310. In some embodiments, the FEC can be calculated for all possible combination of features. However, in additional embodiments, only a certain number of combinations may be calculated. In still more embodiments, one or more machine learning methods may be utilized to converge on potential combinations to calculate, wherein the machine learning processes can be trained on an administrator-provided training set and/or historical data.

Figure 4:
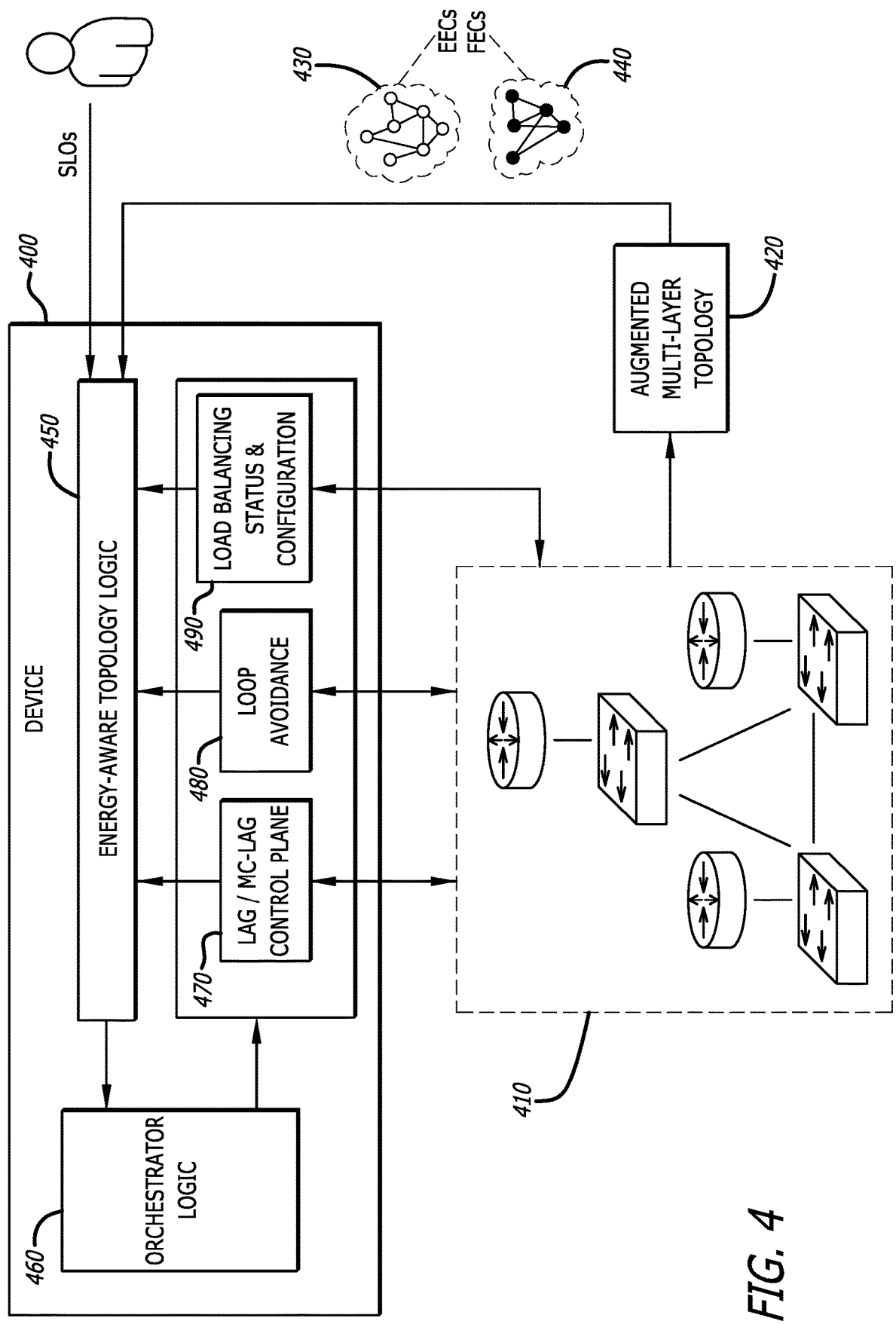
FIG. 4 is a conceptual block diagram of a network device suitable for energy-aware traffic forwarding and loop avoidance in accordance with an embodiment of the disclosure.

Referring to FIG. 4, a conceptual block diagram of a network device 400 suitable for energy-aware traffic forwarding and loop avoidance in accordance with an embodiment of the disclosure is shown. The device 400 can include a processor (not shown) and a memory (not shown) communicatively coupled to the processor which can execute a plurality of logics including an energy-aware topology logic 450 and an orchestrator logic 460. Typically, a number of elements are present which can include, but is not limited to, communication ports (not shown) which can be configured to connect to various networks 410.

In a number of embodiments, a network 410 will comprise a plurality of devices such as switches, routers, etc. The network 410 can generate or otherwise comprise an augmented multi-layer topology 420. In various embodiments this augmented topology can include various types of data including sustainability-related attributes/capabilities, energy source data, and/or power consumption data. Based on that augmented multi-layer topology data 420, one or more EECs 430 and FECs 440 can be generated and provided to the device 400. Specifically, the EECs 430 and FECs 440 can be passed to an energy-aware topology logic 450.

During operation of the network 410, various data may be collected, captured, or otherwise provided to the device 400. In the embodiment depicted in FIG. 4, the device 400 can process link aggregation data and/or multichassis link aggregation group control plane data (shown as LAG/MC-LAG control plane 470). The embodiment of the device 400 is also shown processing loop avoidance data 480, and load balancing status and configuration data 490. Loop avoidance data can be associated with one or more spanning tree protocols (STP, RSTP, MSTP, etc.). Load balancing status and configuration data can indicate what type of load balancing is used (ECMP, etc.) and the current status of one or more devices in the network 410 in relation to that configuration.

In many embodiments, the energy-aware topology logic 450 can receive all of the available data to generate an energy-aware configuration that can be sent or otherwise provided to the network 410 to modify one or more aspects of that network 410. The energy-aware configuration can be configured to operate the network 410 in a manner that can take sustainability-related metrics into account. In some embodiments, this can include modifying the paths of traffic flow such that network devices that are powered with a sustainable power source (solar, wind, geo-thermal, etc.) are preferred compared to network devices powered by more polluting sources of power (coal, gas, etc.). In more embodiments, the energy-aware configurations can activate or deactivate certain sustainability-related attributes/capabilities within devices of the network 410. By way of non-limiting example, certain devices may be powered down, or put in a lower power "sleep" mode.

In certain embodiments, the device 400 may include an orchestrator logic 460 which can direct various operations related to the energy-aware configuration. For example, the orchestrator logic 460 can collect data needed to generate the energy-aware configuration. In further embodiments, the orchestrator logic 460 can pass, broadcast, or otherwise direct the generated energy-aware configuration to the network 410 for implementation. As those skilled in the art will recognize, the orchestrator logic 460 may be executed within a controller (not shown) for the device 400.

Although a specific embodiment for a device 400 suitable for energy-aware configuration generation is described above with respect to FIG. 4, any of a variety of systems and/or processes may be utilized in accordance with embodiments of the disclosure. For example, the device 400 may be configured with one or more controller that directs various elements, logics, or other components of the device 400 to perform various operations. The elements depicted in FIG. 4 may also be interchangeable with other elements of FIGS. 1-3, and 5-10 as required to realize a particularly desired embodiment. An alternative method of generating an energy-aware configuration via a path computation element is shown below.

Figure 5:
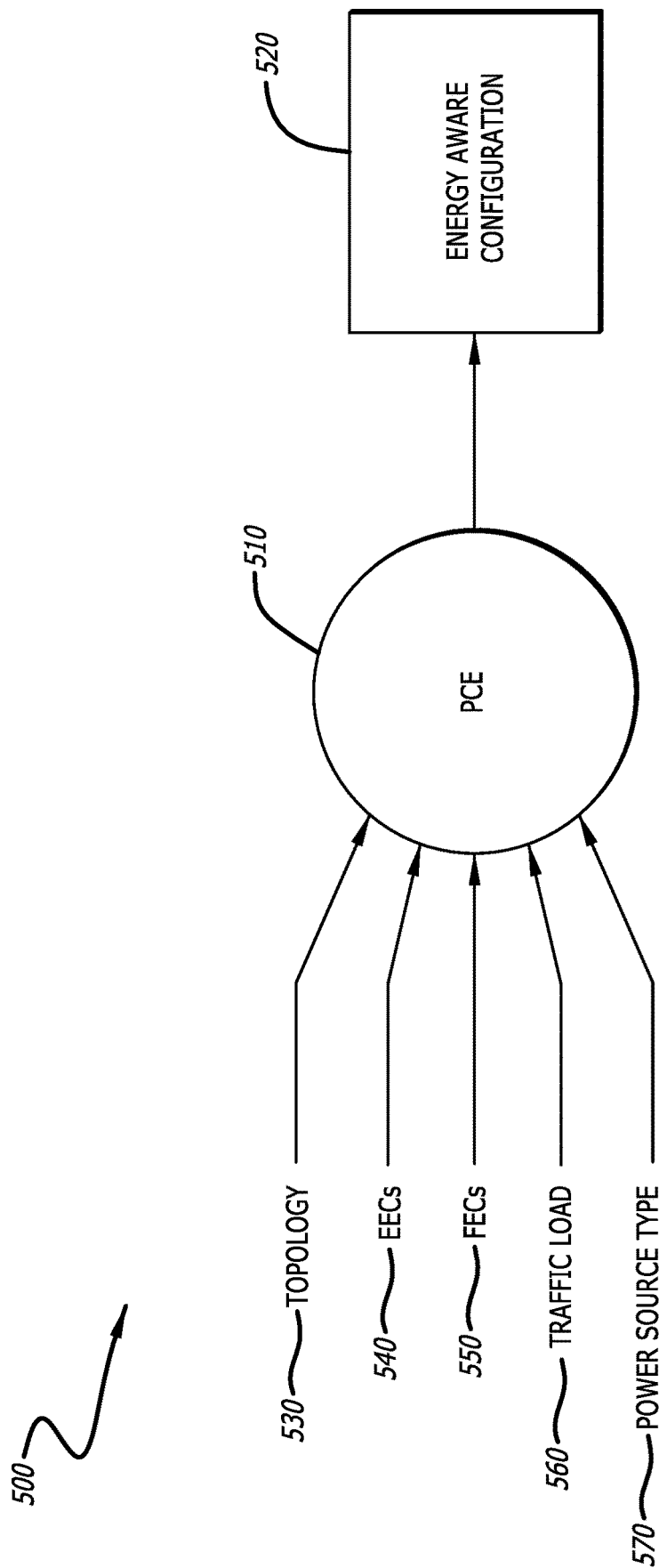
FIG. 5 is a conceptual illustration of a path computation element suitable for energy-aware traffic forwarding and loop avoidance in accordance with an embodiment of the disclosure.

Referring to FIG. 5, a conceptual illustration of a path computation element 510 suitable for energy-aware traffic forwarding and loop avoidance in accordance with an embodiment of the disclosure is shown. In some embodiments, an element can determine one or more paths suitable for energy-aware traffic forwarding, load balancing, etc. These path computation elements 510 can be utilized in conjunction or in place of the generation of EECs or FECs described above.

In the embodiment depicted in FIG. 5, the path computation element 510 can generate an energy-aware configuration 520 based on a number of inputs 530-570. In certain embodiments, the output of the path computation element 510 may be utilized as another input in an energy-aware topology logic which can then generate an energy-aware configuration. The inputs that can be utilized may include, but are not limited to, topology data 530, EECs 540, FECs 550, traffic load data 560, and/or power source type data 570.

In various embodiments, the topology data 530 can be related to understanding the L2, L3 or other topologies of a given network, or portion of the network. In additional embodiments, EECs 540 and FECs 550 may be similar to what is described above with reference to FIGS. 2-3. In further embodiments, the traffic load data 560 can be data related to the amount of traffic that is traversing across the network devices within a given network. In more embodiment, the traffic load data 560 can be associated with the input and/or output traffic of the device associated with the path computation element 510. Finally, the power source type data 570 can be configured to indicate what type of power source is supplying the power being provided to one or more network devices within the network.

Figure 6:
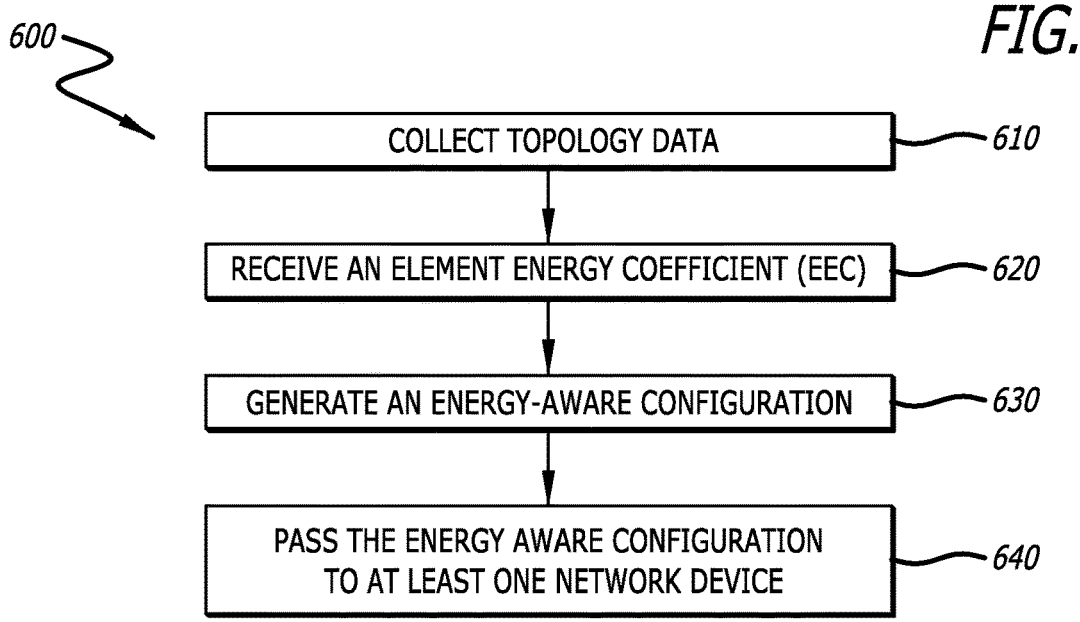
FIG. 6 is a flowchart depicting a process for managing a network with sustainability-related energy usage measurements in accordance with an embodiment of the disclosure.

Referring to FIG. 6, a flowchart depicting a process 600 for managing a network with sustainability-related energy usage measurements in accordance with an embodiment of the disclosure is shown. In a number of embodiments, the process 600 can collect topology data (block 610). As discussed above, the topology data can be collected in a variety of ways and may involve data related to multiple levels of the topology. The topology data may be associated with an entire network or a portion/partition of a network.

In more embodiments, the process 600 can receive an element energy coefficient (EEC) (block 620). As discussed above, the EEC may include data related to energy consumption and/or power source type. The EEC can be calculated for one or more elements within a device. In some embodiments, the EEC may be generated for all elements within a device, and each device within the network may have elements that require the generation of an EEC. However, in certain embodiments, the EEC may only be generated for a portion of the elements. The selection of this portion of elements for EEC generation may be selected based on, in part, historical data, a pre-determined selection, devices that satisfy one or more predetermined thresholds, and/or elements selected from one or more machine learning methods, etc.

In various embodiments, the process 600 can generate an energy-aware configuration (block 630). The energy-aware configuration can be generated based at least on the received EEC data. As described in more detail above, the energy-aware configuration can be configured to modify one or more of the network devices within a network. The generated energy-aware configuration can be subsequently passed to at least one network device within the network (block 640). In most embodiments, the modifications can allow for a more sustainable operation of the network. This can often mean that less power is utilized to operate the network and/or cleaner sources of power are utilized. In still more embodiments, the generation of the EEC can be coupled with other types of data to create an even more robust energy-aware configuration.

Although a specific embodiment for a process 600 to manage a network with EEC data is described above with respect to FIG. 6, any of a variety of systems and/or processes may be utilized in accordance with embodiments of the disclosure. For example, the process 600 may be generated in response to a request for generation or may generate after a predetermined time interval occurs. The aspects described in FIG. 6 may also be interchangeable with other elements of FIGS. 1-5, and 7-10 as required to realize a particularly desired embodiment. Managing a network based on FEC data is described below.

Figure 7:
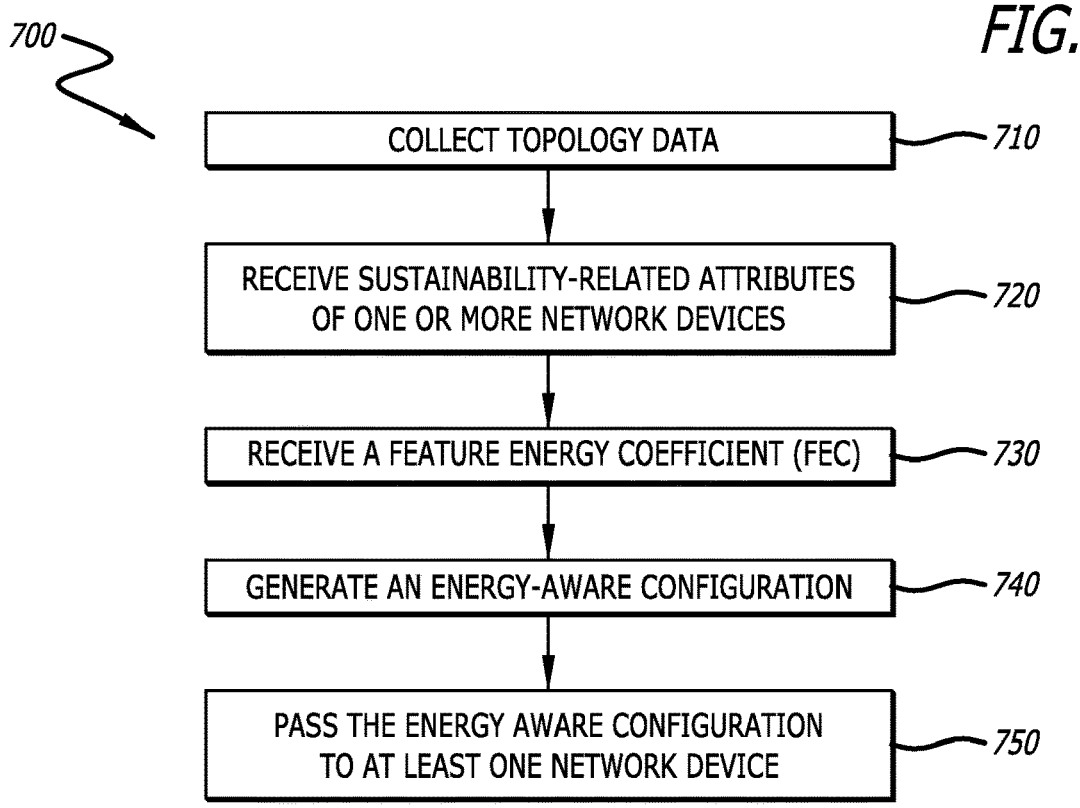
FIG. 7 is a flowchart depicting a process for managing a network with sustainability-related capability measurements in accordance with an embodiment of the disclosure.

Referring to FIG. 7, a flowchart depicting a process 700 for managing a network with sustainability-related capability measurements in accordance with an embodiment of the disclosure is shown. In a number of embodiments, the process 700 can collect topology data (block 710). As discussed above, the topology data can be collected in a variety of ways and may involve data related to multiple levels of the topology. The topology data may be associated with an entire network or a portion/partition of a network.

In further embodiments, the process 700 can receive sustainability-related attributes of one or more network devices (block 720). As discussed previously, each device within a network can have a plurality of features, attributes, and/or capabilities that can be turned on or off based on the desired application. Often, these capabilities can be remotely activated or deactivated, such as through received configuration data. In more embodiments, the one or more of the plurality of capabilities can be sustainability related. In still further embodiments, the capabilities can be broadcast or otherwise transmitted to other devices on the network via a bitmap or other messaging means.

In additional embodiments, the process 700 can receive a feature energy coefficient (FCC) (block 730). As detailed above within the discussion of FIG. 3, FECs can indicate the potential power usage associated with a variety of feature combinations on a per-element or per-device basis. In many embodiments, the FEC is generated based on the received sustainability-related attributes of the device and/or elements under analysis. The process 700 can subsequently generate an energy-aware configuration (block 740). The energy-aware configuration can be configured to remotely activate and/or deactivate a number of capabilities, attributes, and/or features within at least one network device or element within the network. When the energy-aware configuration has been generated, the process 700 can pass that configuration to at least one network device (block 750). As those skilled in the art will appreciate, the energy-aware configuration can be deployed and implemented by many devices within a network, such as those that have one or more capability or attribute modified by the energy-aware configuration.

Although a specific embodiment for a process 700 to manage a network with FEC data is described above with respect to FIG. 7, any of a variety of systems and/or processes may be utilized in accordance with embodiments of the disclosure. For example, the process 700 may be generated in response to a request for generation or may generate after a predetermined time interval occurs. Additionally, the FEC may, in certain embodiments, be generated in the same device that generates the energy-aware configuration, thus negating the need to receive the FEC data. The aspects described in FIG. 7 may also be interchangeable with other elements of FIGS. 1-6, and 8-10 as required to realize a particularly desired embodiment. Managing a network based on both EEC and FEC data is described below.

Figure 8:
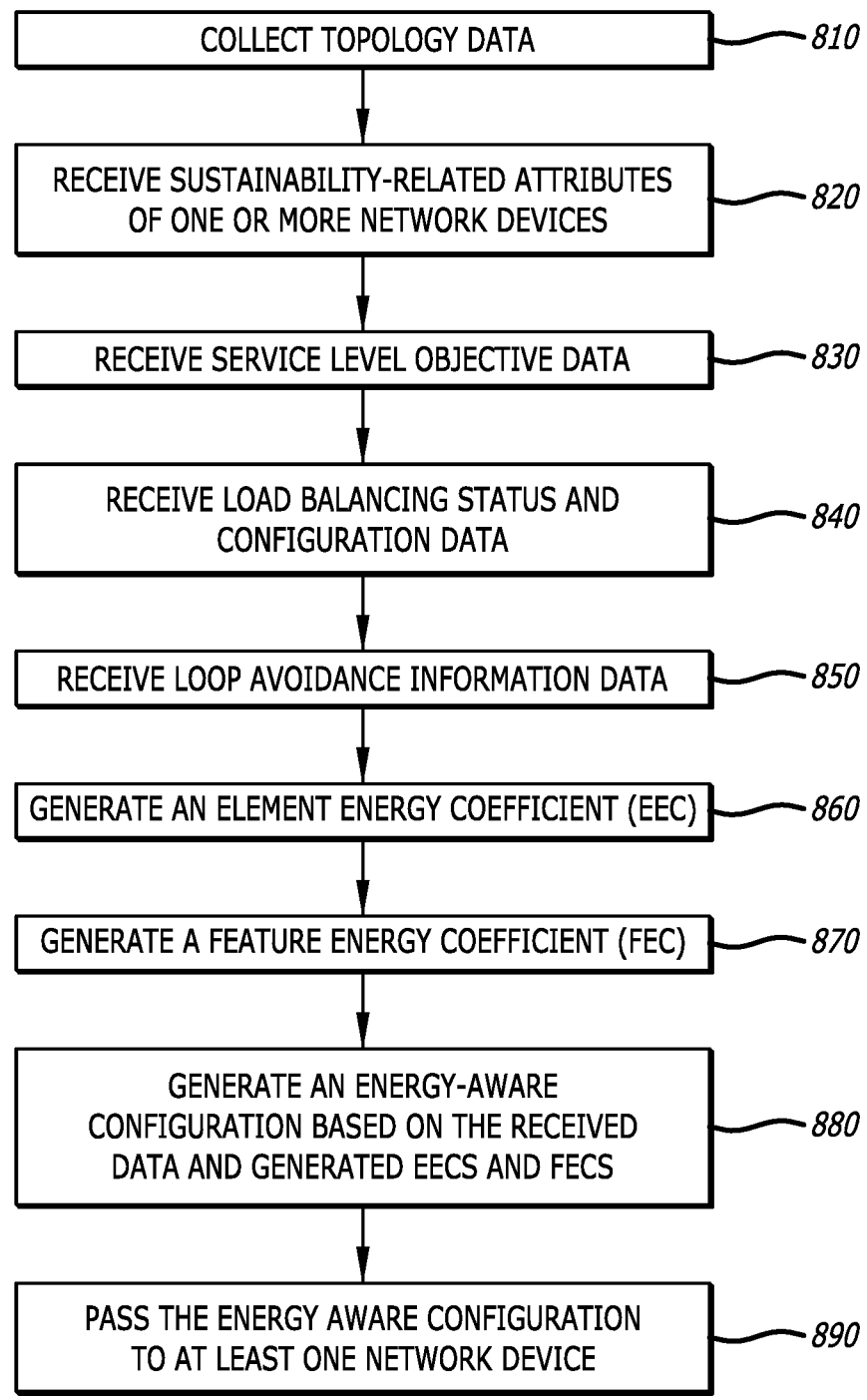
FIG. 8 is a flowchart depicting a process for managing an energy-aware network based on a plurality of sustainability-related data in accordance with an embodiment of the disclosure.

Referring to FIG. 8, a flowchart depicting a process 800 for managing an energy-aware network based on a plurality of sustainability-related data in accordance with an embodiment of the disclosure is shown. In a number of embodiments, the process 800 can collect topology data (block 810). As discussed above, the topology data can be collected in a variety of ways and may involve data related to multiple levels of the topology. The topology data may be associated with an entire network or a portion/partition of a network.

In further embodiments, the process 800 can receive sustainability-related attributes of one or more network devices (block 820). As discussed previously, each device within a network can have a plurality of features, attributes, and/or capabilities that can be turned on or off based on the desired application. Often, these capabilities can be remotely activated or deactivated, such as through received configuration data. In more embodiments, the one or more of the plurality of capabilities can be sustainability related. In still further embodiments, the capabilities can be broadcast or otherwise transmitted to other devices on the network via a bitmap or other messaging means.

In still more embodiments, the process 800 may receive service level object (SLO) data (block 830). An SLO can often be related to a service-level agreement (SLA) between a service provider and a customer. As discussed above, an SLO can be an agreed upon method of measuring the performance of the service provider such that disputes between the service provider and the customer can be avoided. The SLO may, in certain embodiments, be comprised of one or more quality of service (QoS) measurements.

In yet additional embodiments, the process 800 can receive load balancing status and configuration data (block 840). Often, load balancing can be accomplished through one or more methods, such as, but not limited to, ECMP as described above. Details about this type of load balancing, or the type of load balancing being utilized within one or more network devices can be compiled into load balancing and configuration data. In this way, the process 800 can acquire visibility about the current state of the load balancing.

In even more embodiments, the process 800 can receive loop avoidance information data (block 850). As those skilled in the art will recognize, various methods can be utilized to avoid and mitigate looping within a network. Data related to those methods can be transmitted out to various network devices, such as a network device that can generate an energy-aware configuration. In many embodiments, the loop avoidance data can include, but are not limited to, current protocols utilized (STP and variants, etc.), as well as the current spine and leaf switching architectures, etc. In this way, the device generating the energy-aware configuration can configure it to maintain a loop avoidance architecture.

In still additional embodiments, the process 800 can generate an EEC (block 860). As discussed above, the EEC may include data related to energy consumption and/or power source type. An EEC may be generated for each element within a device. However, in certain embodiments, the EEC may only be generated for a portion of the elements. The selection of this portion of elements for EEC generation may be selected based on, in part, historical data, a predetermined selection, devices that satisfy one or more predetermined thresholds, and/or elements selected from one or more machine learning methods, etc. In some embodiments, the generation of the EEC can be based on all received data available to the process 800 as discussed above.

In yet further embodiments, the process 800 can receive an FEC (block 870). As detailed above within the discussion of FIG. 3, FECs can indicate the potential power usage associated with a variety of feature combinations on a per-element or per-device basis. In many embodiments, the FEC is generated based on the received sustainability-related attributes of the device and/or elements under analysis.

In various embodiments, the process 800 can generate an energy-aware configuration based on the previously received data and generated EECs and FECs (block 880). Again, the energy-aware configuration can be configured to modify one or more of the network devices within a network. Typically, the generated energy-aware configuration is generated based on one or more sustainability goals such as, but not limited to, reducing power, selecting traffic paths based on the power source types that are powering the network devices, etc. Upon generation, the process 800 can pass the energy-aware configuration to at least one network device within the network (block 890). Upon enactment of the energy-aware configuration, the network can begin functioning in a more sustainable mode of operation.

Although a specific embodiment for a process 800 to manage a network by generating an energy-aware configuration with various received and generated data is described above with respect to FIG. 8, any of a variety of systems and/or processes may be utilized in accordance with embodiments of the disclosure. For example, the process 800 may receive an EEC or FEC that is externally generated by a different network device. In this way, the energy-aware configuration can still be generated in the same manner and with the same data. The aspects described in FIG. 8 may also be interchangeable with other elements of FIGS. 1-7, and 9-10 as required to realize a particularly desired embodiment. Managing a network device that can be modified via an energy-aware configuration is described below.

Referring to FIG. 9, a flowchart depicting a process 900 for operating a network device within an energy-aware network in accordance with an embodiment of the disclosure is shown. In a number of embodiments, the process 900 can provide network device data (block 910). The network device data can include, but is not limited to, topology data, loop avoidance data, data related to the current configuration of the device, the number, and types of elements within the device, the number of attributes/features/capabilities etc. available, the current configuration of those capabilities, which capabilities are sustainability-related capabilities, and power consumption data. It is contemplated that any data that can be utilized to generate a more efficient energy-aware configuration can be gathered and provided to another device within the network.

The process 900 can subsequently receive an energy-aware configuration (block 920). In additional embodiments, the energy-aware configuration can be similar to the configurations described in the discussions of FIGS. 6-8 as well as other potential embodiments. Upon reception, the process 900 can parse the energy-aware configuration (block 930). Parsing may be required within embodiments that have an energy-aware configuration that includes modifications to multiple types of devices or elements or that may include various rules or heuristics of when to implement the configuration.

When the energy-aware configuration has been parsed, the process 900 can subsequently modify one or more elements within a device based on the energy-aware configuration (block 940). As discussed above, the modification can include a variety of actions. However, typically an energy-aware configuration will modify one or more sustainability-related capabilities of the device, reduce or stop using power, wait to use power until a more sustainable power source is available, pass traffic to more sustainable devices within the network, etc.

In more embodiments, the process 900 can update the network data (block 950), often in response to the modifications based on the received energy-aware configuration. In certain embodiments, the network data can be stored as a particular set of data within the device, which can be updated in response to events such as upon modification of various elements or capabilities of the device. In optional embodiments, the process 900 can receive a request to provide updated network device data (block 960). For example, the device that generates the energy-aware configuration can poll various devices to determine if the network is in a sufficient state. In further embodiments, a request may be received for the current network device data after a predetermined time interval, or in response to a specific event. Eventually, the process 900 can provide the updated network device data (block 970). In various embodiments, this process 900 can repeat.

Although a specific embodiment for a process 900 to manage a device suitable for receiving energy-aware configurations is described above with respect to FIG. 9, any of a variety of systems and/or processes may be utilized in accordance with embodiments of the disclosure. For example, the process 900 may generate an EEC or FEC internally as part of the network device data. The aspects described in FIG. 9 may also be interchangeable with other elements of FIGS. 1-8, and 10 as required to realize a particularly desired embodiment. Utilizing a path computation element to generate data for an energy-aware configuration is described below.

Referring to FIG. 10, a flowchart depicting a process 1000 for utilizing a path configuration element to generate an energy-aware configuration in accordance with an embodiment of the disclosure is shown. As disclosed above in the discussion of FIG. 5, a path configuration element can be utilized in certain embodiments to generate data associated with an energy-aware configuration. Specifically in the embodiment process depicted in FIG. 10, the path computation element is utilized to generate a path selection. However, as described above in the discussion of FIG. 5, a path computation element can be utilized to generate an energy-aware configuration in certain embodiments.

The process 1000 can collect topology data (block 1010). As discussed above, the topology data can be collected in a variety of ways and may involve data related to multiple levels of the topology. The topology data may be associated with an entire network or a portion/partition of a network.

In many embodiments, the process 1000 can receive EEC and FEC data (block 1020). The EEC and FEC data can be received from an external device, however in certain embodiments, it may also be generated within the same device as the path computation element. In additional embodiments, the process 1000 can receive current traffic data (block 1030). Traffic data may comprise, but is not limited to, data related to traffic input and output of a plurality of devices, or any data related to projected traffic. Additionally, the process 1000 may receive power source data (block 1040). As described above, the type of power source can include what type of power source is being used to power the devices within the network.

In further embodiments, the process 1000 can determine, via a path computation element, an energy-aware path selection based on the collected and received data (block 1050). In this way, the path computation element can determine paths based on energy-aware related data such as EECs and FECs. When the energy-aware path selection is determined, the process 1000 can generate an energy-aware configuration based on that determined energy-aware path selection (block 1060).

Although a specific embodiment for a process 1000 to utilize a path computation element as part of energy-aware configuration generation is described above with respect to FIG. 10, any of a variety of systems and/or processes may be utilized in accordance with embodiments of the disclosure. For example, the process 1000 may be implemented on each device within the network, a portion of the devices, or in a single device that also generates the energy-aware configuration. The aspects described in FIG. 10 may also be interchangeable with other elements of FIGS. 1-9 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
   a processor;
   a memory commutatively coupled to the processor;
   a plurality of elements;
   a communication port coupled with one or more neighboring devices; and
   an energy-aware topology logic configured to:
      collect topology data from one or more network devices, wherein each of the one or more network devices include a plurality of elements;
      receive power source data and power usage data related to one or more of the plurality of elements;
      generate an element energy coefficient (EEC) for the one or more of the plurality of elements;
      generate an energy-aware configuration for at least one of the one or more network devices; and
      pass the generated energy-aware configuration to the at least one network device, wherein the energy-aware configuration is configured to steer traffic based on at least one sustainability-related metric.

2. The device of claim 1, wherein the topology data is collected from L2 and L3 topologies.

3. The device of claim 2, wherein the energy-aware configuration is configured to avoid looping within the L2 and L3 topologies.

4. The device of claim 1, wherein the energy-aware topology data is further configured to receive sustainability-related capabilities of one or more network devices.

5. The device of claim 1 wherein the EEC is generated at least in part on the received power source data and power usage data.

6. The device of claim 1 wherein the EEC is generated for a single network device.

7. The device of claim 1 wherein the EEC is generated for a plurality of network devices.

8. The device of claim 7, wherein the plurality of network devices includes a link aggregation group.

9. The device of claim 1, wherein the energy-aware topology is further configured to receive link aggregation data.

10. The device of claim 9, wherein the link aggregation data is received via a link aggregation control protocol.

11. The device of claim 1, wherein the energy-aware topology is further configured to receive loop avoidance data.

12. The device of claim 11, wherein the loop avoidance data is received via a spanning tree protocol.

13. The device of claim 1, wherein the energy-aware topology is further configured to receive load balancing data.

14. The device of claim 1, wherein the energy-aware topology is further configured to receive service level objective data.

15. The device of claim 1, wherein the energy-aware configuration is passed to an orchestrator logic that is configured to push the energy-aware configuration across one or more layers of the network to the at least one network device.

16. A device comprising:
    a processor;
    a memory commutatively coupled to the processor;
    a plurality of elements;
    a communication port coupled with one or more neighboring devices; and
    an energy-aware topology logic configured to:
       collect topology data from one or more network devices, wherein each of the one or more network devices include a plurality of elements;
       receive sustainability-related capabilities of one or more network devices;
       generate a feature energy coefficient (FEC) for one or more of the plurality of elements;
       generate an energy-aware configuration for at least one of the one or more plurality of elements, wherein the energy-aware configuration is configured to modify at least one sustainability-related capability within the at least one network device; and
       pass the generated energy-aware configuration to the at least one network device, wherein the network device modifies the at least one sustainability-related capability.

17. The device of claim 16 wherein the energy-aware topology data is further configured to receive energy consumption data.

18. The device of claim 17 wherein the energy consumption data comprises data associated with a plurality of capability combinations.

19. The device of claim 16, wherein the sustainability-related capability modification is associated with the operation of one or more elements within a plurality of network devices.

20. A network device element comprising:
    an energy-aware topology logic configured to:
       collect topology data from one or more network devices, wherein each of the one or more network devices include a plurality of elements;
       receive element energy coefficient data and feature energy coefficient data associated with the one or more network devices;
       receive current traffic data;
       receive power source data;
       receive sustainability-related capabilities of one or more network devices; and
       generate an energy-aware configuration for at least one of the one or more network devices, wherein the energy-aware configuration includes an energy-aware path selection.

* * * * *